United States Patent
Sadasivam et al.

(10) Patent No.: US 10,884,749 B2
(45) Date of Patent: Jan. 5, 2021

(54) CONTROL OF SPECULATIVE DEMAND LOADS

(71) Applicant: International Business Machines Corporation, Armonk, NY (US)

(72) Inventors: Satish Kumar Sadasivam, Erode (IN); Puneeth A. H. Bhat, Bangalore (IN); Shruti Saxena, Kanpur (IN); Sangram Alapati, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 6 days.

(21) Appl. No.: 16/364,928

(22) Filed: Mar. 26, 2019

(65) Prior Publication Data

US 2020/0310813 A1  Oct. 1, 2020

(51) Int. Cl.
*G06F 9/38* (2018.01)
*G06F 12/0875* (2016.01)
*G06F 9/30* (2018.01)

(52) U.S. Cl.
CPC ........ *G06F 9/3806* (2013.01); *G06F 9/30043* (2013.01); *G06F 12/0875* (2013.01); *G06F 9/3804* (2013.01); *G06F 2212/452* (2013.01)

(58) Field of Classification Search
CPC . G06F 12/0875; G06F 9/3804; G06F 9/30043
See application file for complete search history.

(56) References Cited

U.S. PATENT DOCUMENTS

| 7,664,942 B1* | 2/2010 | Tremblay | G06F 9/3804 |
| | | | 712/207 |
| 9,519,586 B2 | 12/2016 | Gilbert | |
| 2014/0208039 A1 | 7/2014 | Gilbert | |
| 2014/0282622 A1* | 9/2014 | Frazier | G06F 11/348 |
| | | | 719/318 |
| 2017/0371790 A1* | 12/2017 | Dwiel | G06F 12/0811 |

FOREIGN PATENT DOCUMENTS

WO  2017048605 A1  3/2017

OTHER PUBLICATIONS

Karkala et al., "A Project Report on Improving Cache Performance by Mitigating Last Level Cache Pollution," Paper Under the Guidance of Dr. Ming-Hwa Wang, Spring Quarter 2014, (COEN 283), 19 pages.

Cilku et al., "Improving Performance of Single-path Code Through a Time-predictable Memory Hierarchy," Proceedings of the IEEE 20th International Symposium on Real-Time Distributed Computing, 2017, DOI: 10.1109/ISORC.2017.17, 9 pages.

(Continued)

*Primary Examiner* — Zachary K Huson
(74) *Attorney, Agent, or Firm* — Jared C. Chaney (57) ABSTRACT

Aspects of the present disclosure relate to control of speculative demand loads. In some embodiments, the method includes receiving instructions for a branch in a program, detecting the branch load is in the cache, monitoring a number of completed loads for the program, determining a cache pollution ratio of executed loads to completed loads, providing the cache pollution ratio to a branch prediction unit, and altering load instructions for the branch based on the cache pollution ratio.

18 Claims, 6 Drawing Sheets

(56) References Cited

OTHER PUBLICATIONS

Mutlu et al., "Cache Filtering Techniques to Reduce the Negative Impact of Useless Speculative Memory References on Processor Performance," Department of Electrical and Computer Engineering, The University of Texas at Austin, Printed Jan. 9, 2019, 8 pages.
Sendag et al., "The Effect of Executing Mispredicted Load Instructions in a Speculative Multithreaded Architecture," Department of Electrical and Computer Engineering, Minnesota Supercomputing Institute, University of Minnesota, Printed Jan. 9, 2019, 8 pages.
Mell et al., "The NIST Definition of Cloud Computing," Recommendations of the National Institute of Standards and Technology, U.S. Department of Commerce, Special Publication 800-145, Sep. 2011, 7 pages.
Sadasivam et al., "System and Method for Dynamic Accuracy and Threshold Control for Branch Classification," U.S. Appl. No. 15/964,320, filed Apr. 27, 2018.
Sadasivam et al., "System and Method for Multi-Level Classification of Branches," U.S. Appl. No. 15/865,756, filed Jan. 9, 2018.

\* cited by examiner

CONTROL OF SPECULATIVE DEMAND LOADS

BACKGROUND

Aspects of the present disclosure relate to computer memory, more particular aspects relate to cache pollution.

BRIEF SUMMARY

The present disclosure provides a method, computer program product, and system of control of speculative demand loads. In some embodiments, the method includes receiving instructions for a branch, determining that the instructions contain a command to bring a load into a system cache, detecting that the load is not in the system cache, identifying a number of executed loads for the program, obtaining a number of completed loads for the program, and determining a cache pollution ratio based on a ratio between the number of times the load is completed and the number of times the load is executed.

Some embodiments of the present disclosure can also be illustrated by a computer program product comprising a computer readable storage medium having program instructions embodied therewith, the program instructions executable by a computer to cause the computer to receive instructions for a branch; determine that the instructions contain a command to bring a load into a system cache; detect that the load is not in the system cache; identify a number of executed loads for the program; obtain a number of completed loads for the program; and determine a cache pollution ratio based on a ratio between the number of times the load is completed and the number of times the load is executed.

Some embodiments of the present disclosure can also be illustrated by a system comprising a processor and a memory in communication with the processor, the memory containing program instructions that, when executed by the processor, are configured to cause the processor to receive instructions for a branch; determine that the instructions contain a command to bring a load into a system cache; detect that the load is not in the system cache; identify a number of executed loads for the program; obtain a number of completed loads for the program; and determine a cache pollution ratio based on a ratio between the number of times the load is completed and the number of times the load is executed.

DETAILED DESCRIPTION

Speculative execution is an optimization technique where a computer system performs some task that the system may need before it is known whether the task is actually needed. Speculative execution can prevent delays that would be incurred by waiting to perform certain tasks until after it is known that the task is needed. For example, if a calculation takes 10 milliseconds to perform, but a computer system may be able to determine whether the result of that calculation is needed until 8 milliseconds in the future, the calculation can be performed speculatively. If it is determined, after that 8-millisecond delay, that the result is indeed needed, the computer system would only need to wait another 2 milliseconds after the determination for the result to be available if the calculation were executed speculatively during the 8-second delay. If it turns out the result is not needed after all, most changes made by the work are reverted or discarded (flushed) and the results are ignored.

The primary objective of speculative execution is to provide more concurrency in situations in which extra resources are available, thereby improving the speed of the overall process. Concurrency refers to the ability of different parts or units of a program, algorithm, or problem to be executed out-of-order or in partial order, without affecting the final outcome. This allows for parallel execution of the concurrent units, which can significantly improve overall speed of the execution in multi-processor and multi-core systems. Concurrency can be used to decompose a program, algorithm, or problem into order-independent or partially-ordered components or units. This approach is employed in a variety of areas, including branch prediction in pipelined processors, value prediction for exploiting value locality, prefetching memory and files, and optimistic concurrency control in database systems. Branching is the duplication of an object or load under revision control (such as a source code file or a directory tree) so that modifications can happen in parallel along both branches Speculative execution can result in the wrong instructions being executed if the branches are predicted incorrectly. Instructions that are executed in the wrong path can include loads, stores, arithmetic, and control flow types. Arithmetic and control instructions do not generally affect any state changes in the cache memory, but load and store instructions that are executed in the speculative path do result in state changes in various levels of caches. For example, running arithmetic instructions may not change what is stored in a cache, but running load instructions may change what is stored in the cache.

In some embodiments, a cache miss occurs when the data requested for processing by a component or application is not found in the cache memory or a level of the cache memory. Each cache miss slows down the overall process, because after a cache miss, the central processing unit (CPU) may look for a higher level cache and/or random access memory (RAM) for that data.

Loading data for wrong speculative paths may increase cache misses because useful data was evicted from the cache in order to make room to execute the wrong speculative path. In some embodiments, execution means that a load, an object, or data (collectively referred to herein as a load) is brought to a cache, and a completion means that the load is utilized by the system. In some embodiments, a mispredicted branch is a branch (e.g., program, algorithm, or problem) that is predicted but not actually completed.

Performance degradation due to cache pollution may become even more of a problem while running in simultaneous multi-threading (SMT) mode. Simultaneous multi-threading is a technique for improving the overall efficiency of superscalar CPUs with hardware multithreading. SMT permits multiple independent threads of execution to better utilize the resources provided by modern processor architectures. Since several levels of caches are shared between all hardware threads, the cache pollution is unrequired data in the cache created by speculative cache misses that are executed but not completed.

This problem is also used by attackers to come-up with the several side channel attacks like Spectre and Meltdown. Meltdown is a hardware vulnerability affecting some processors. It allows a rogue process to read all memory, even when it is not authorized to do so. Spectre is a vulnerability that affects modern microprocessors that perform branch prediction. On most processors, the speculative execution resulting from a branch misprediction may leave observable side effects that may reveal private data to attackers. For example, if the pattern of memory accesses performed by such speculative execution depends on private data, the resulting state of the data cache constitutes a side channel through which an attacker may be able to extract information about the private data using a timing attack.

Some embodiments of the present disclosure provide a hardware solution to control the speculative executions that occur beyond a hard-to-predict branch instruction and that are often not completed. A monitoring engine may gather information on the number of completed loads that miss the cache and the number of executed loads that miss the cache. The ratio of these two metrics (i.e., completed load misses/executed load misses) may provide a rough estimate of the performance impact of cache pollution for a program. This rough estimate is referred to as cache pollution ratio. In some embodiments, the hardware may have the capability to detect and measure the cache pollution ratio.

Some embodiments of this disclosure can decrease cache pollution by preventing the speculative demand loads of a hard to predict branch (a branch that is often mispredicted). For example, in a microarchitecture scheme, the hardware can have the necessary logic to detect and calculate the cache pollution ratio. The hardware can put the speculative loads for a program having a cache pollution ratio that does not meet a threshold on hold until the load gets confirmed. In some embodiments, these speculative loads are treated as normal demand loads by the processor.

Figure 1:
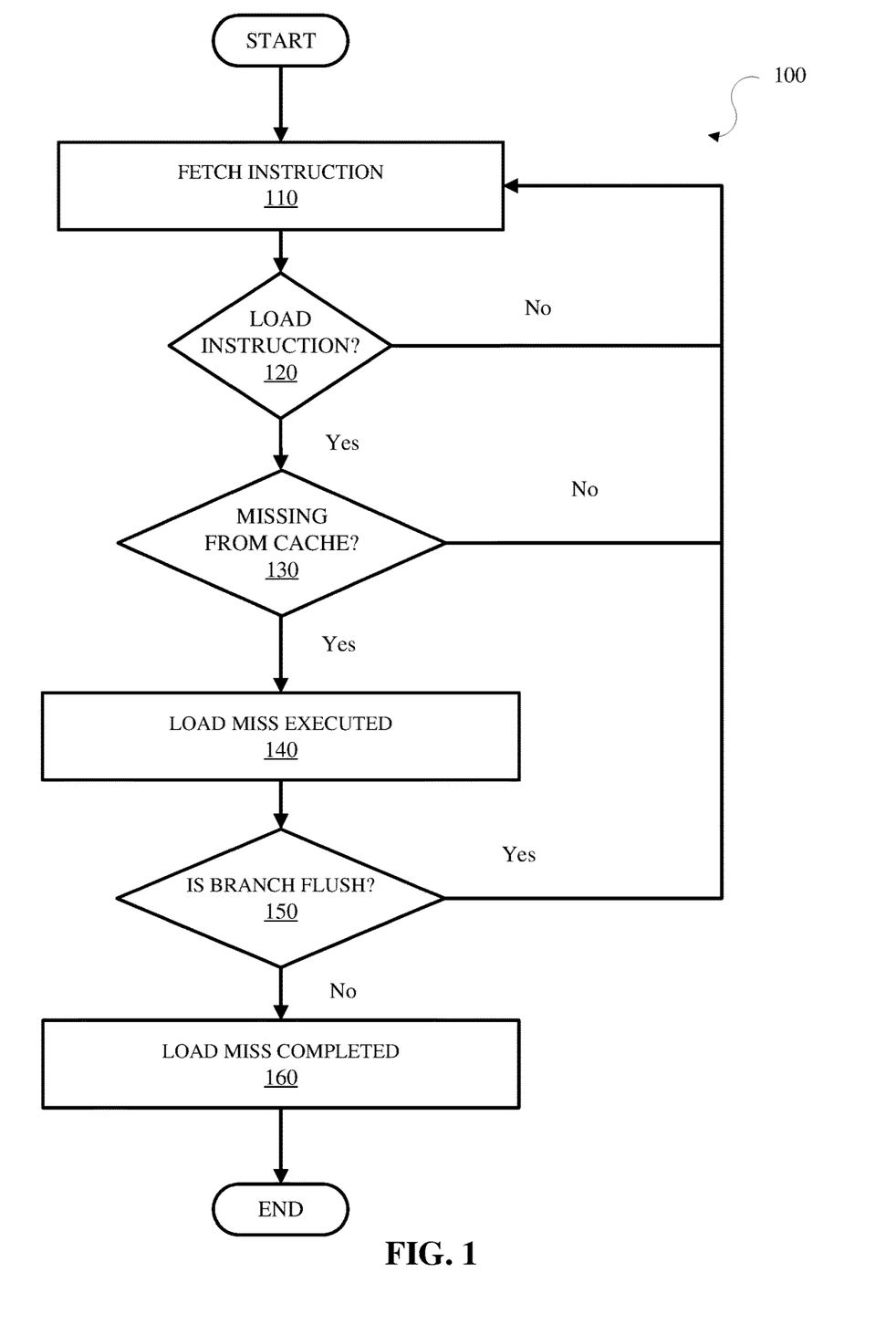
FIG. 1 is a block diagram illustrating components of system determining a cache pollution ratio for control of speculative demand loads according to various embodiments of the present invention.

FIG. 1 illustrates an example method 100 of determining a cache pollution ratio for a program based on a ratio of completed load misses to executed load misses. In block 110, instructions for a branch are received. In block 120, it is determined whether the instructions have a directive to bring the branch load into a cache.

In block 130, it is determined if the load is missing from the cache (e.g., the load has been executed). In some embodiments, if the load is already in the cache, then the pollution ratio may not be affected and the system may return to block 110 and fetch the next set of instructions. However, if the load is not in the cache then the system may go on to execute the branch.

In block 140, based on a determination from block 130 that a load is missing from the cache, the load is executed, and a count is added to the load miss executed total for the load.

In block 150, it is determined if the branch is flush. A branch is flush when the branch prediction is determined to be incorrect, or is not used, and the data for the branch is flushed out of the cache. If the branch is flush then the system may move on to fetch the next instruction.

If the branch was completed, then in block 160, a count is added for the load miss completed total. A load miss completed means that the data was used but was not present in the memory when it was needed by the system. For example, if a load is missing from the cache, but the system uses the load and has to get the data from another memory system, then a load miss count would be added to the load miss completed total. In some embodiments, the speculative cache pollution ratio may be calculated as load miss completed divided by load miss executed. For example, as the speculative cache pollution ratio approaches zero, e.g., when a load in the program is not often completed after being executed, a branch in the program is not likely to be correct often and more often should not be loaded into the cache. Alternatively, as the speculative cache pollution ratio approaches 1, e.g., when a load is often completed after being executed, the branch is more likely to be correct often and more often should be loaded into the cache.

Figure 2:
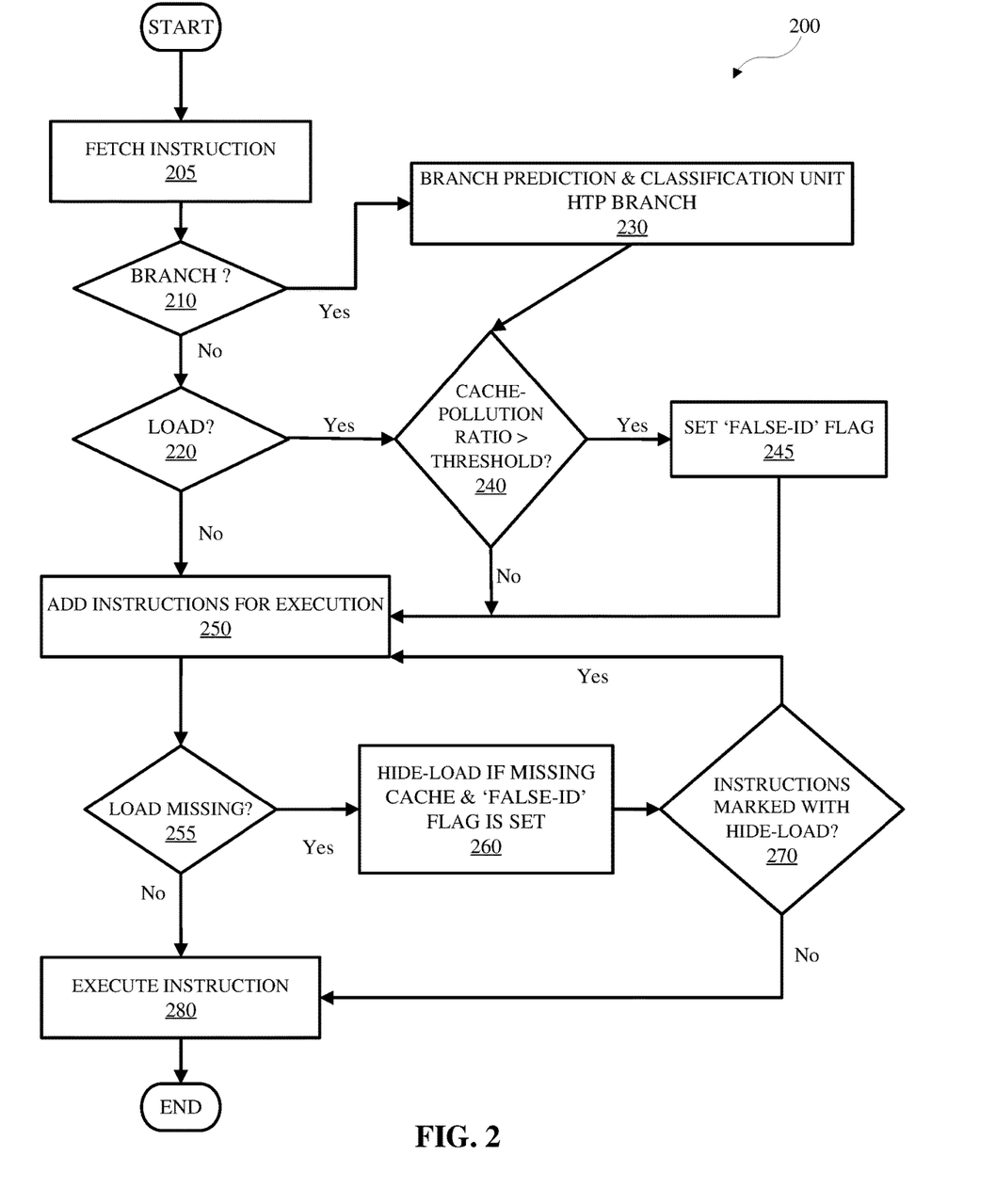
FIG. 2 is a block diagram illustrating components of a system for controlling a speculative demand load according to various embodiments of the present invention.

FIG. 2 illustrates an example method 200 of controlling speculative demand loads based on a cache pollution ratio.

At block 205, the system may fetch instructions.

At block 210, the system may determine if the instruction is a branch.

When the instructions do not contain a branch, the system may determine at block 220 whether the instructions indicate a load. In some embodiments, if the instructions in the predicted path do not indicate a load then the instructions may be dispatched for execution without referencing the cache pollution ratio. In some embodiments, if the instructions indicate a load then the cache pollution ratio may be referenced.

At block 230 the system may route the instructions to a branch prediction unit and perform prediction and classification of the branches. Branch classification may partition branches into a set of branch classes statically and/or dynamically by assigning similar behavior to the same class of branches. Hence, by analyzing the behavior of a class of branches, branch prediction accuracy for that class may be optimized for particular system. For example, prediction accuracy may be increased by associating each branch class with a suitable predictor for that class. Specifically, resources may be allocated such that a simple predictor may be used to predict simple branches and a more complex predictor may be used to predict hard-to-predict branches.

It should be understood that the heuristics described in this disclosure are the result of profiling branches in an industry standard CPU benchmark. Different classes of branches have common characteristics (such as number of branch mispredictions) that produce the above-listed heuristics. It is appreciated that other embodiments may apply a different set of heuristics. In still other implementations, a subset of the above-listed heuristics may be utilized.

In some embodiments, based on their prediction accuracy, branches may be classified into simple branches and hard-to-predict (HTP) branches. Simple branches are branches whose outcome may be predicted with a high level of accuracy, and HTP branches are branches whose outcome may be predicted with a low level of accuracy. Simple branches may further be classified into static branches and easy-to-predict simple branches. Static branches are unidirectional branches and may be static taken (i.e., unidirectional taken) or static non-taken (i.e., unidirectional non-taken) branches. Simple branches that are not static but may be predicted with a high accuracy are easy-to-predict simple branches.

HTP branches may be classified into flip flop HTP branches (dynamic in nature that have a high switch count probability value (e.g., 0.8 or above); dynamic HTP branches (dynamic branches that have a switch count probability that is less than that of flip flop HTP branches); biased positive HTP branches (HTP that have a high misprediction rate and are biased towards the taken direction); biased negative HTP branches (HTP that have a high misprediction rate and are biased towards the not-taken direction); and normal HTP (all other types of HTP branches). It should be understood that the branch classification unit may be used to classify branch instructions into types or classes that are different and/or a subset of simple and HTP.

At block 240, system 200 determines if the cache pollution ratio for a program is higher than a threshold value. In some embodiments, a default threshold value that is based on available system resources is used. For example, the system could find a threshold that gives peak performance of the CPU requiring the loads during certain times of the day, memory usage, or processor usage. In some embodiments, the user may define a threshold. For example, in some embodiments a user may tailor the threshold to increase system performance or the performance of a particular application. For instance, if an application or program has many low cache pollution ratio loads, then the user may tailor the threshold based on the importance of the application.

In some embodiments, there are multiple cache pollution ratio thresholds, each threshold representing a different cache. For example, a sample scheme can have three levels (e.g., an L1 threshold, L2 threshold, and L3 threshold), each level representing a different cache, (where L1 represents a first cache, L2 represents a second cache, and L3 represents a third cache). In an example, the first cache L1 is the closest to the processor and therefore has the shortest latency, the third cache L3 the farthest and therefore has the longest latency, and the second cache is somewhere between the first cache and third cache in regard to latency and distance. The first cache may also have the smallest storage capacity, the third cache may have the largest storage capacity, and the second cache may have a capacity larger than the first cache and smaller than the third cache. In some embodiments, one or more of the caches can be built into the processor itself. In some embodiments, CPUs may have built-in L1 and L2 caches per core and share a single L3 cache on the motherboard, while other designs have the L3 on the CPU die itself. The thresholds corresponding to each cache can be as follows:

L1 threshold—may identify demand load requests that should not flow up to the first cache
L2 threshold—may identify demand load requests that should not flow up to the second cache and beyond (i.e., to L1)
L3 threshold—may identify demand load requests that should not flow up to the third cache and beyond (i.e., to L1 and L2)

In some embodiments, the threshold level can vary depending on how the system is running. For example, if the processor is waiting on data to be loaded into the cache then the threshold(s) may be reduced, but if system is continuously short on cache space then the system can increase the threshold.

At block 245, if the cache pollution ratio is higher than the threshold a False-ID flag is set in the load instructions.

At block 250 instructions may be added to an instruction issue queue. In some embodiments, the system may maintain multiple queues. For example, each cache may have a different queue. The queue for results is necessary to resolve issues such as branch mispredictions and exceptions/traps. In some embodiments the results queue allows programs to be restarted after an exception, which requires the instructions to be completed in program order. The queue allows results to be discarded due to mispredictions on older branch instructions and exceptions taken on older instructions. In some embodiments, the instructions in the queue may require data that has already been loaded. In some embodiments, the instructions may require data that has not been loaded.

At block 255 it may be determined if the load is missing from the cache, such as L1. If a load is in the cache, the system may allow the instructions to be executed. For example, if the load is already in the cache, cache pollution may not be changed by holding the instructions. If the instructions are not in the cache, the system may determine if the instructions should be executed.

At block 260, after a determination that there is not a load, a determination is made whether the instructions should be executed or hidden (i.e., hide-load) until they system can determine if the load may be required (e.g., completed). In some embodiments, the system can base the decision to execute based on the cache pollution ratio. For example, the system may make a determination not to execute the instructions if the cache pollution ratio does not exceed a threshold. In some embodiments, the decision can be based on the results of the HTP determination. For example, the system may make a determination that the instructions should not be executed based on a determination that the instructions include an HTP branch. In some embodiments, the decision can be based on a combination of the cache pollution ratio and the HTP determination. For example, the system may make a determination that instructions should not be executed if the instructions include an HTP branch and the cache pollution ratio does not exceed a threshold. In some embodiments, when the instruction marked as "false load" is issued to a load store unit (LSU) it may execute the instruction provided the load data is available in the L1 data cache. If the data is not available in the L1 cache the demand load request may not be sent by the load-store unit to fetch the data from other levels or cache or memory. Instead the instruction may be rejected and sent back to the instruction issue queue.

At block 270 if the instructions are marked with a hide load, the system may send the instructions back to 250 to add instructions to hold the instructions for future determination. For example, if the instructions have been marked as a hide-load, the system may send them back to the end of the queue. At a later point the system may determine if the instructions can be used or if they should be flushed. Alternatively, if there is no hide-load instructions the load may be loaded into the cache and sent to 280 for execution.

At block 280, when the instruction is rejected the instruction remains in the instruction issue queue until it is NTC (Next to complete). If the instruction reaches the state of NTC then it means that the speculated path is correct and the system may execute the load instruction and complete the same.

Following is an example of pseudo code specifying how load instruction execution, as shown in FIG. 2, can be handled by the processor to reduce the cache pollution.
1) Fetch a new instruction→Inst
   a) If 'Inst' is a branch
      i) Route to Branch Prediction Unit and perform prediction and classification
      ii) BrClass←Branch Class (HTP/Simple)
      iii) If BrClass==HTP; then Set the HTP_path=True else HTP_path=False b) Else if 'Inst' is a load
  i) Check if HTP_path=True & Speculative-Cache-Pollution Ratio>SPEC_LD_THRESH;
  ii) If yes, set a 'false-ld' bit in the load instruction
  iii) If no, reset the 'false-ld' bit in the load instruction
2) Continue the Decode/Dispatch Stage add the Instruction for Execution.
3) Select the instruction 'Inst' for execution from Instruction Queue
4) If 'Inst' is a load
  a) Issue the instruction to a Load/Store Unit
  b) Hide-Load←Load Data missing the Cache & 'false-ld' flag is set
  c) If 'Hide-Load'==True; then reject the Load instruction and do not insert to Load-Miss Queue until it is the Next-To-Complete (falls in Correct Branch Path)

This code is merely used as an example; it is appreciated that other methods of coding the hardware are possible.

Figure 3:
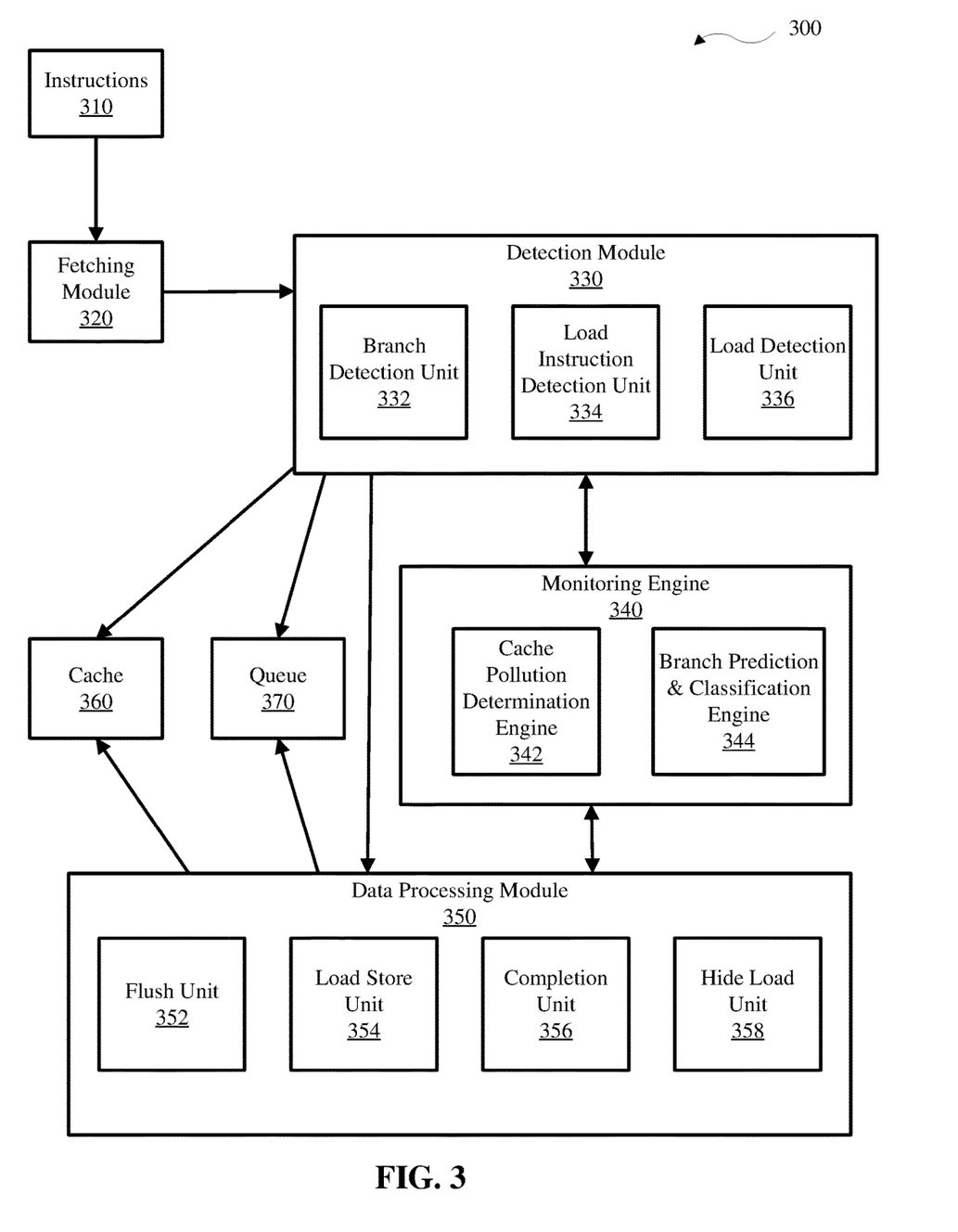
FIG. 3 is a block diagram illustrating components of a speculative demand load system according to various embodiments of the present invention.

FIG. 3 is as block diagram illustrating example components of a speculative demand load system according to one illustrative embodiment. Speculative demand load system 300 includes instructions 310, a fetching module 320, a detection module 330, a monitoring engine 340, and a data processing module 350. In some embodiments, the detection module 330 includes a branch detection unit 332, a load instruction detection unit 334, and a load detection unit 336. In some embodiments, the monitoring engine 340 includes a cache pollution determination engine 342 and a branch prediction & classification engine 344. In some embodiments, the data processing module 350 includes a flush unit 352, a load store unit 354, a completion unit 356, and a hide-load unit 358.

Speculative demand load system 300 may receive instructions 310 with fetching module 320. In some embodiments, the detection module 330 determines if the instructions contain a branch with branch detection unit 332 and if the instructions contain a load with load instruction detection unit 334. In some embodiments, the detection module 330 can use load detection unit 336 to check the cache to see if the load is already in the cache. In some embodiments, if a load is detected by load detection unit 336 in cache 360, system 300 can send instructions 310 directly to queue 370 for implementation.

Speculate demand load system 300 may monitor the state and history of the instructions 310. For example, cache pollution determination engine 342 can determine the cache pollution ratio for instructions 310 and branch prediction & classification engine 344 can determine if instructions 310 include an HTP branch.

In some embodiment, using the information received from detection module 330 and monitoring engine 340 data, processing module 350 can process and/or execute the instructions. In some embodiments, when the instructions are executed but not completed, flush unit 352 can remove the load from the cache. In some embodiments, when a determination is made to execute the instructions, load store unit 354 can bring the load into the cache. In some embodiments, when instructions have been executed and the load is required, completion unit 356 can direct the system to the load in cache 360 for completion. In some embodiments, based on information from the monitoring engine 340, hide-load unit 358 can send the instructions back to queue for future determination or execution at a later time, or send the instructions to load store unit 354 for execution.

In some embodiments, when instructions are executed by load store unit 354, but not completed by completion unit 356, the information on the completion and execution can be sent back to monitoring engine 340 for cache pollution ratio determination by cache pollution determination engine 342.

Figure 4:
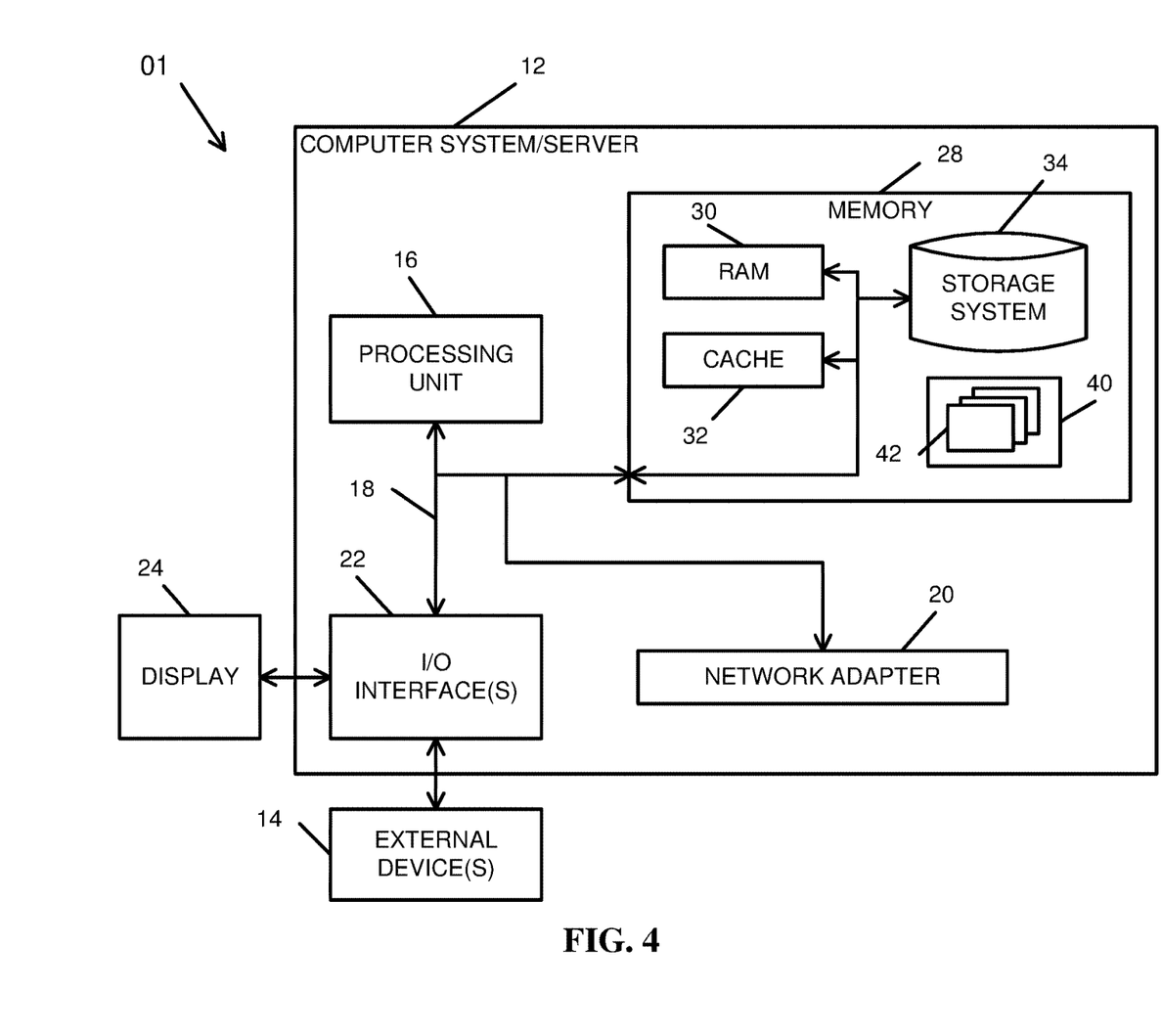
FIG. 4 depicts a computer system according to various embodiments of the present invention.

In an example embodiment, the computer system is a computer system 01 as shown in FIG. 4. Computer system 01 is only one example of a computer system and is not intended to suggest any limitation as to the scope of use or functionality of embodiments of the present disclosure. Regardless, computer system 01 is capable of being implemented to perform and/or performing any of the functionality/operations of the present disclosure.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As may be further depicted and described below, memory 28 may include at least one program product having a set (e.g., at least one) of program modules that are configured to carry out the functions/operations of embodiments of the invention.

Program/utility 40, having a set (at least one) of program modules 42, may be stored in memory 28 by way of example, and not limitation. Example program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
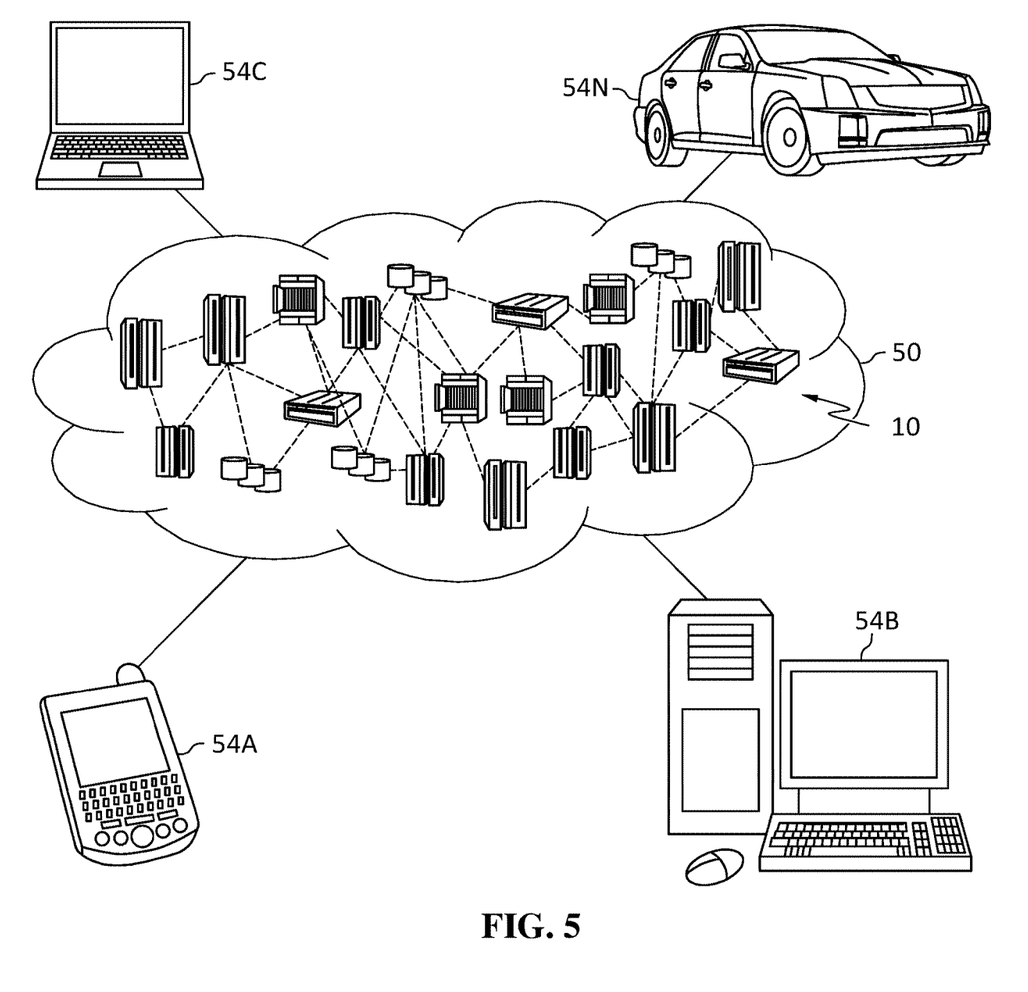
FIG. 5 depicts a cloud computing environment according to various embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
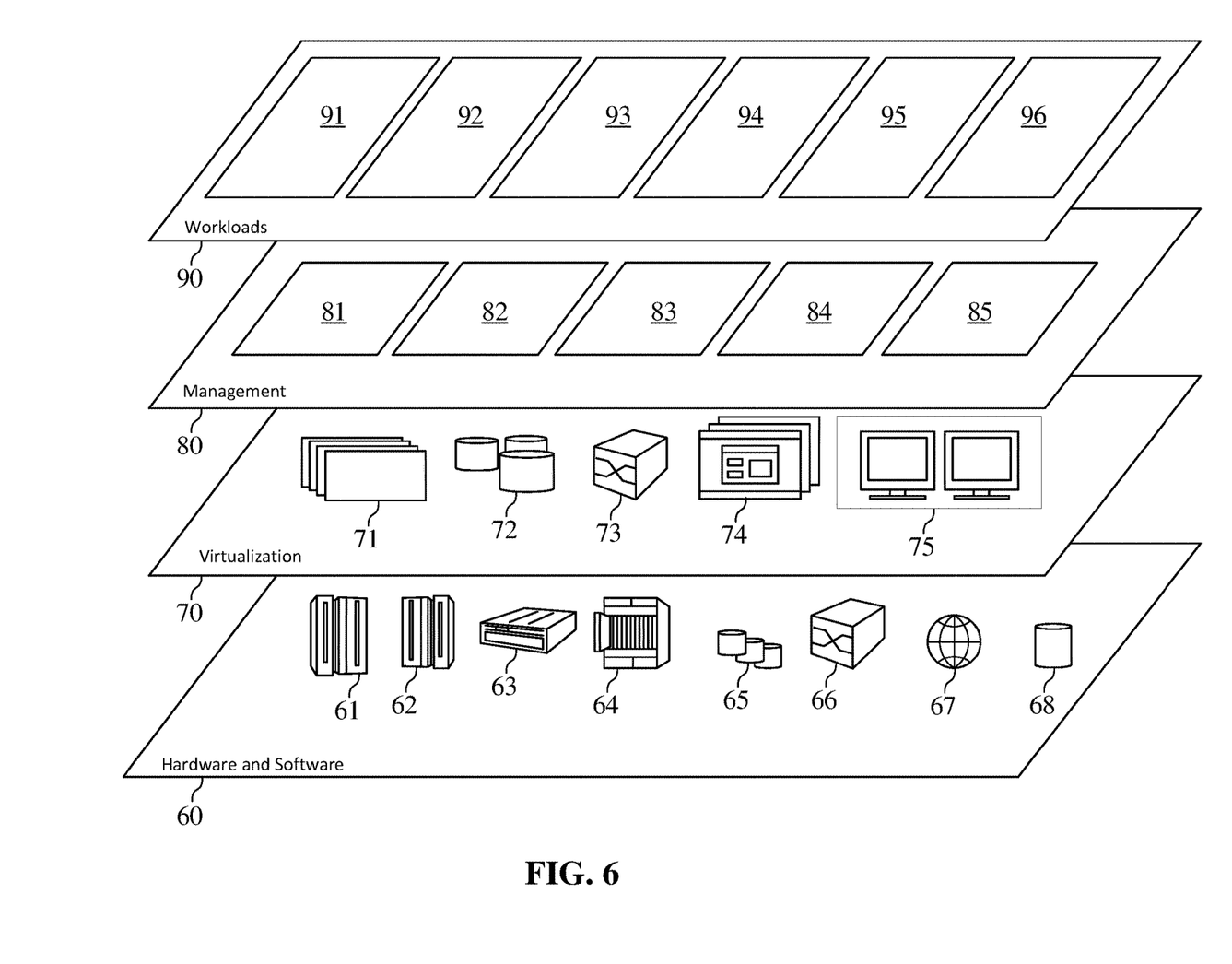
FIG. 6 depicts abstraction model layers according to various embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speculative execution monitoring 96.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations may be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising: receiving program instructions; detecting a hard-to-predict (HTP) branches in the program instructions;
determining that the program instructions contain a load command to bring a load into a system cache;
detecting that the load is not in the system cache;
identifying a number of executed loads for the program;
obtaining a number of completed loads for the program;
determining a cache pollution ratio based on a ratio between the number of completed loads and the number of executed loads;
comparing the cache pollution ratio to a first threshold for a first cache in the system cache;
determining that the cache pollution ratio exceeds the first threshold; and
blocking the load command from loading to the first cache based on the cache pollution ratio exceeding the first threshold.

2. The method of claim 1, further comprising:
comparing the cache pollution ratio to a second threshold for a second cache in the system cache;
determining that the cache pollution ratio exceeds the second threshold; and
blocking the load command from loading to the second cache based on the cache pollution ratio exceeding the second threshold.

3. The method of claim 2,
wherein the first cache has a first latency that is shorter than a second latency of the second cache and a third latency of a third cache; and
wherein the third latency is longer than the second latency.

4. The method of claim 2,
wherein the first cache has a first storage space that is smaller than a second storage space of the second cache and a third storage space of a third cache; and
wherein the third storage space is larger than the second storage space.

5. The method of claim 2, wherein the first threshold is higher than the second threshold, and wherein the second threshold is higher than a third threshold.

6. The method of claim 1, wherein the first threshold is determined based on available system resources.

7. The method of claim 1, wherein the first threshold is defined by a user.

8. The method of claim 1, further comprising:
comparing the cache pollution ratio to a second threshold for a second cache in the system cache and a third threshold for a third cache in the system cache;
determining that the cache pollution ratio exceeds the second threshold;
determining that the cache pollution ratio does not exceed the third threshold;
blocking the load command from loading to the second cache based on the determining that the cache pollution ratio exceeds the second threshold;
allowing the load command to load to a third cache based on the determining that the cache pollution ratio does not exceed the third threshold.

9. The method of claim 1 further comprising, determining that the branch is not flush.

10. The method of claim 1, further comprising:
comparing the cache pollution ratio to the first threshold for the first cache in the system cache;
determining that the cache pollution ratio does not exceed the first threshold; and
allowing the load command to load to the first cache based on the determining that the cache pollution ratio does not exceed the first threshold.

11. A computer program product, the computer program product comprising a computer readable storage medium having program instructions embodied therewith, the program instructions executable by a computer to cause the computer to:
receive program instructions;
determine that the instructions contain a load command to bring a load into a system cache;
detect that the load is not in the system cache;
identify a number of executed loads for the program;
obtain a number of completed loads for the program;
determine a cache pollution ratio based on a ratio between the number of completed loads and the number of executed loads;
comparing the cache pollution ratio to a first threshold for a first cache in the system cache;
determining that the cache pollution ratio exceeds the first threshold; and
block the load command from loading to the first cache based on the cache pollution ratio exceeding the first threshold.

12. A system comprising:
a processor; and
a memory in communication with the processor, the memory containing program instructions that, when executed by the processor, are configured to cause the processor to perform a method, the method comprising:
receiving the program instructions,
detecting a hard-to-predict (HTP) branches in the program instructions;
determining that the program instructions contain a load command to bring a load into a system cache,
detecting that the load is not in the system cache,
identifying a number of executed loads for the program instructions,
obtaining a number of completed loads for the program,
determining a cache pollution ratio based on a ratio between the number of completed loads and the number of executed loads;
comparing the cache pollution ratio to a first threshold for a first cache in the system cache;
determining that the cache pollution ratio exceeds the first threshold; and
blocking the load command from loading to the first cache based on the cache pollution ratio exceeding the first threshold.

13. The system of claim 12, wherein the method further comprises:
comparing the cache pollution ratio to a second threshold for a second cache in the system cache;
determining that the cache pollution ratio exceeds the second threshold; and
blocking the load command from loading to the second cache based on the cache pollution ratio exceeding the second threshold.

14. The system of claim 13,
wherein the first cache has a first latency that is shorter than a second latency of the second cache and a third latency of third cache; and
wherein the third latency is longer than the second latency.

15. The system of claim 13,
wherein the first cache has a first storage space that is smaller than a second storage space of the second cache and a third storage space of the third cache; and
wherein the third storage space is larger than the second storage space.

16. The system of claim 13, wherein the first threshold is higher than the second threshold, and wherein the second threshold is higher than the third threshold.

17. The system of claim 12, wherein the first threshold is determined based on available system resources.

18. The system of claim 12, wherein the first threshold is defined by a user.

* * * * *